United States Patent [19]
Natsume et al.

[11] Patent Number: 5,658,072
[45] Date of Patent: Aug. 19, 1997

[54] VEHICULAR LAMP HAVING APPEARANCE OF DEPTH

[75] Inventors: Kazunori Natsume; Hitoshi Tanaka, both of Shizuoka, Japan

[73] Assignee: Koito Manufacturing Co., Ltd., Tokyo, Japan

[21] Appl. No.: 362,163

[22] Filed: Dec. 22, 1994

[30] Foreign Application Priority Data

Dec. 22, 1993 [JP] Japan .................... 5-73210 U
Nov. 21, 1994 [JP] Japan .................... 6-309440

[51] Int. Cl.⁶ .................................................. F21V 5/00
[52] U.S. Cl. .................... 362/331; 362/61; 362/80; 362/309; 362/332; 362/336
[58] Field of Search ............................ 362/308, 309, 362/326–333, 336, 61, 80, 338, 339

[56] References Cited

U.S. PATENT DOCUMENTS

| | | | |
|---|---|---|---|
| 1,726,460 | 8/1929 | Upp | 362/336 |
| 2,767,305 | 10/1956 | Onksen et al. | 362/327 |
| 2,767,306 | 10/1956 | Gaither et al. | 362/329 |
| 3,020,396 | 2/1962 | Worboys | 362/331 |
| 4,484,254 | 11/1984 | Puckett et al. | 362/309 |
| 4,588,619 | 5/1986 | Fiscus et al. | 362/61 |
| 4,680,678 | 7/1987 | Iwaki | 362/61 |
| 4,689,728 | 8/1987 | Yamai et al. | 362/331 |
| 4,785,385 | 11/1988 | Holst | 362/309 |
| 4,855,877 | 8/1989 | Otaka | 362/61 |
| 4,972,302 | 11/1990 | Masuyama et al. | 362/327 |
| 4,993,807 | 2/1991 | Sakakibara | 362/326 |
| 5,308,200 | 5/1994 | Otsuka | 362/80 |
| 5,340,623 | 8/1994 | Menjo et al. | 428/31 |
| 5,548,498 | 8/1996 | Murakami | 362/336 |

Primary Examiner—Alan Cariaso
Attorney, Agent, or Firm—Sughrue, Mion, Zinn, Macpeak & Seas

[57] ABSTRACT

The front opening of a lamp body with a bulb disposed therein is covered with a lens. The lens is segmented into a plural number of segmental areas. A first fisheye step group composed of convex fisheye steps and a second fisheye step groups composed of concave fisheye steps are alternatingly formed in the segmental areas. In the first fisheye step group, real images of the light source are formed on the front side of the lens by the convex fisheye steps. In the second fisheye step groups, virtual images are formed on the rear side of the lens by the concave fisheye steps. The distance between the real and virtual images of the light source creates an appearance of depth for the lamp.

19 Claims, 12 Drawing Sheets

VEHICULAR LAMP HAVING APPEARANCE OF DEPTH

BACKGROUND OF THE INVENTION

The present invention relates to a marker lamp for vehicular use. More particularly, the invention provides a marker lamp for vehicular use which has an appearance of depth.

In a conventional marker lamp, such as a stop lamp or tail lamp, fisheye steps are formed over the entire surface of the lens so as to vertically diffuse the emitted light beam. The conventional marker lamp though looks flat overall since fisheye steps are formed over the entire surface of the lens.

SUMMARY OF THE INVENTION

The present invention was made in order to overcome such disadvantages accompanying the conventional lamp. Accordingly, an object of the invention is to provide a vehicular lamp capable of presenting a deep and thus attractive appearance.

The above and other objects can be achieved by a provision of a marker lamp for vehicles which, according to the present invention, is characterized in that a front opening of a lamp space with a light source disposed therein is covered with a lens, and the lens includes at least two types of fisheye step groups, of which the first fisheye step group is composed of convex fisheye steps and the second fisheye step group is composed of concave fisheye steps.

In the marker lamp thus constructed, in the first fisheye step group, real images of the light source are formed on the front side of the lens by the convex fisheye steps. In the second fisheye step groups, virtual images are formed on the rear side of the lens by the concave fisheye steps. The distance between the real and virtual images of the light source creates an appearance of depth for the lamp.

BRIEF DESCRIPTION OF THE DRAWINGS

FIGS. 1 through 3 show a first embodiment of a marker lamp for vehicular use constructed according to the present invention, of which

FIGS. 4 through 7B show a second embodiment of an marker lamp for vehicles according to the present invention, of which FIGS. 7A and 7B are enlarged front views showing the operation of the marker lamp of the second embodiment, of which

FIGS. 8 through 12 show a third embodiment of an marker lamp for vehicles according to the present invention, of which FIGS. 13 through 16 show a fourth embodiment of a marker lamp for vehicles according to the present invention, of which

DESCRIPTION OF THE PREFERRED EMBODIMENTS

Preferred embodiments of a marker lamp for vehicular use according to the present invention will be described in detail with reference to the accompanying drawings.

Figure 1:
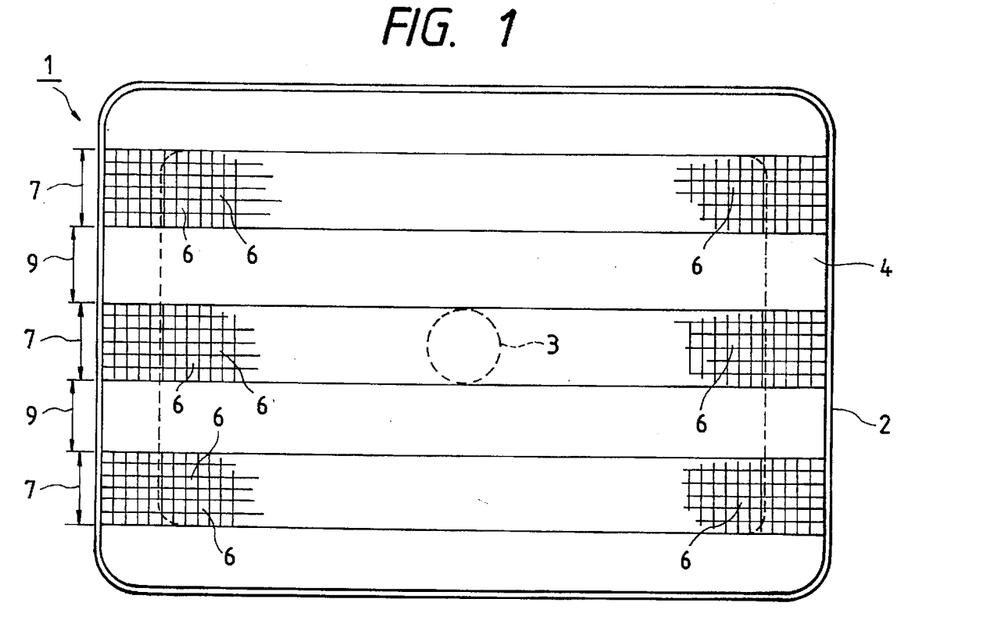
FIG. 1 is a front view showing the marker lamp.
Figure 2:
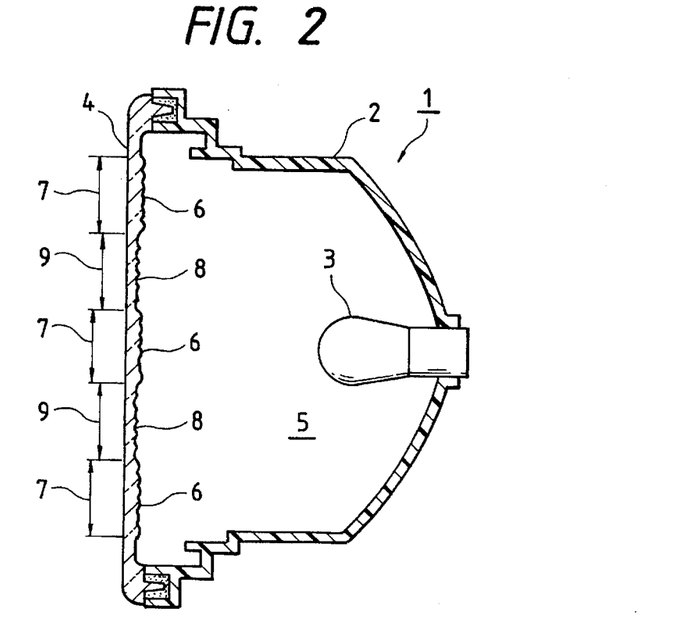
FIG. 2 is a longitudinal sectional view of the marker lamp of the first embodiment.
Figure 3:
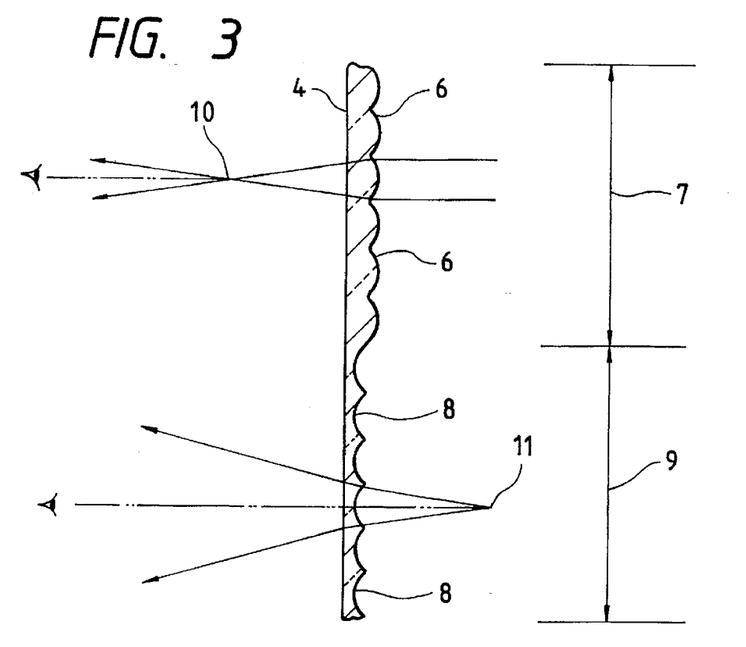
FIG. 3 is an enlarged sectional view showing a key portion of the marker lamp, and is useful in explaining the operation of the first embodiment.

FIG. 1 through 3 show a first embodiment of a marker lamp 1 constructed according to the present invention. The marker lamp 1 is provided with a lamp body 1, a bulb disposed at the center part of the rear portion of the lamp body 2. A lens 4 made of transparent synthetic resin is attached to the lamp body 2 covering a front opening of the lamp body 2. The lamp body 2 and the lens 4 define a lamp space 5.

The lens 4 is vertically segmented into five areas that are equal in width. Convex fisheye steps 6 are formed on the rear sides of the top, middle, and bottom ones of the segmental areas. Groups 7 of those convex fisheye steps 6 will be referred to as first fisheye groups. On the other hand, concave fisheye steps 8 are formed on the rear sides of the second segmental areas as counted from the top and bottom. Groups 9 of those concave fisheye steps 8 will be referred to as second fisheye groups.

In the marker lamp 1, as shown in FIG. 3, real images 10 of the light source are formed on the front side of the lens 4 by the convex fisheye steps 6 of the first fisheye step groups 7. Virtual images 11 of the light source are formed on the rear side of the lens 4 by the concave fisheye steps 8 of the second fisheye step groups 9. The distance between the real images 10 of the light source formed by the first fisheye step groups 7 and the virtual images formed by the second fisheye step groups 9, when viewed in the depth direction, creates an appearance of depth for the lamp.

FIG. 4 through 7B show a second embodiment of a marker lamp 1A according to the present invention.

Figure 4:
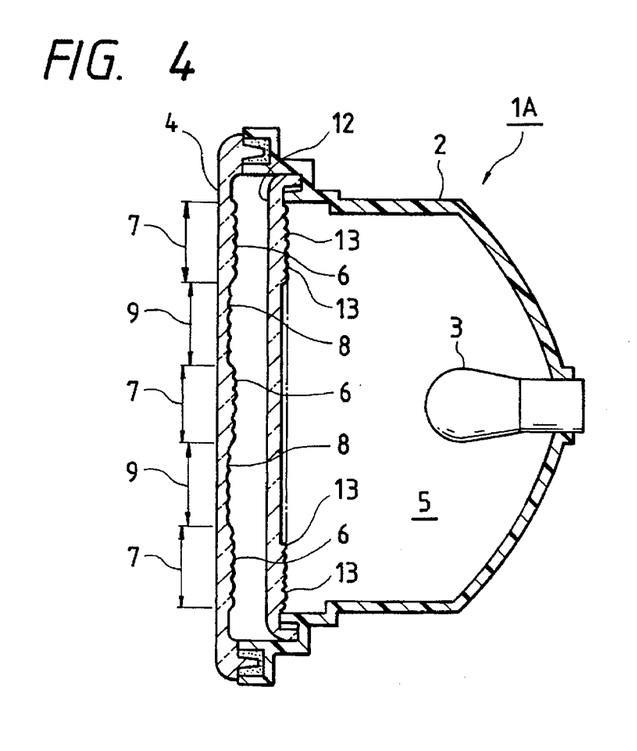
FIG. 4 is a longitudinal sectional view showing the marker lamp of the second embodiment.

The marker lamp 1A of the second embodiment differs from the lamp 1 of the first embodiment in that an inner lens is located on the inner side of the lens 4. The remaining portions of the second embodiment are substantially the same as the corresponding portions of the first embodiment. Hence, no further description of those portions of the second embodiment will be given. In the drawings depicting the second embodiment, like reference numerals designate like or equivalent portions in the drawings of the first embodiment.

Figure 5:
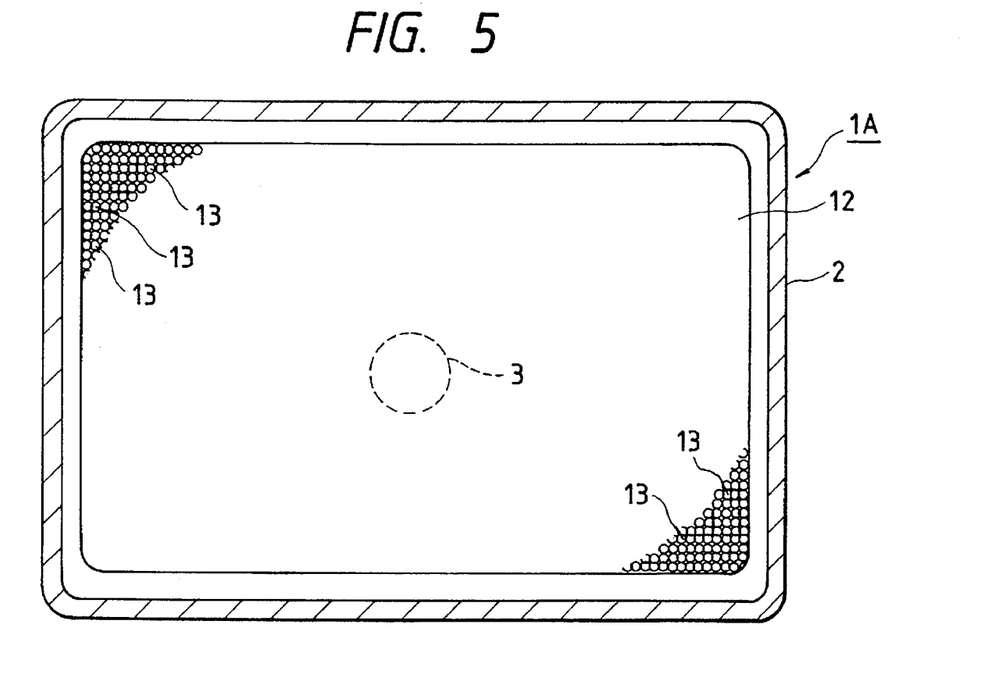
FIG. 5 is a front view showing an inner lens used in the second embodiment.

An inner lens 12 made of transparent synthetic resin is disposed on the inner side of the lens 4. Dewdrop-shaped steps 13, which are circular when viewed from the front and semicircular in cross section, are formed on the rear side of the inner lens 12.

Figure 6:
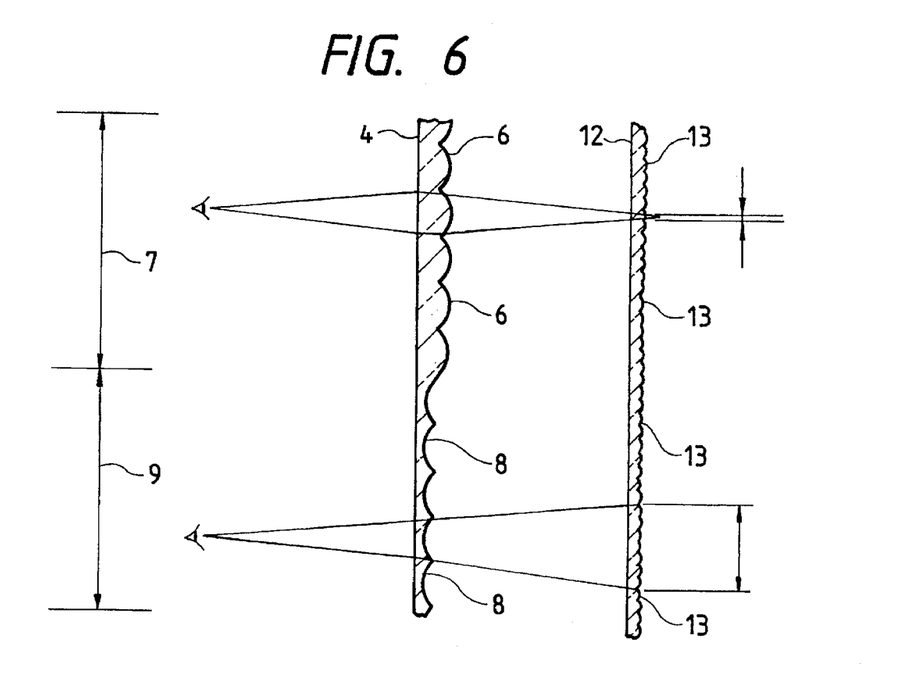
FIG. 6 is an enlarged sectional view showing a key portion of the marker lamp, and is useful in explaining the operation of the second embodiment.
Figure 7A:
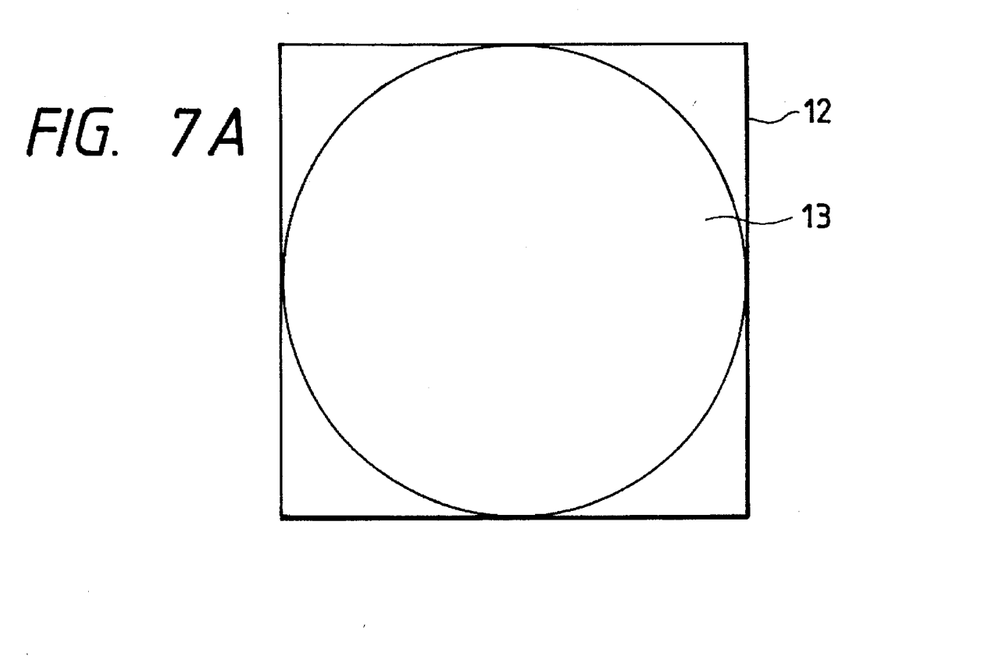
FIG. 7A shows an area of the inner lens that is imaged on one convex fisheye in the first fisheye step group and FIG. 7B shows an area of the inner lens that is imaged on one concave fisheye in the second fisheye step group.

In the marker lamp 1A thus constructed, the enlarged and glittering dewdrop steps 13 are imaged by the fisheye steps 6 of the first fisheye step groups 7 as shown in FIGS. 6 and 7A, respectively.

Figure 7B:
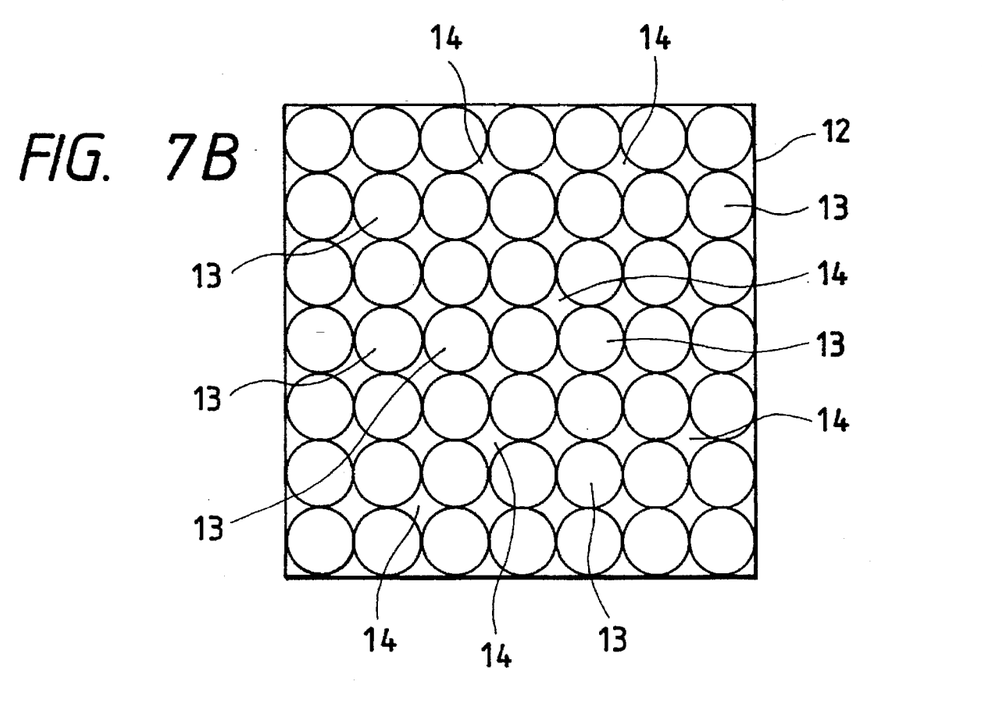

Wide areas of the inner lens 12, viz., a plural number of dewdrop steps 13, are imaged by the fisheye steps 8 of the second fisheye step groups 9. More exactly, the glittering portions are small and dark portions 14 as shown in FIGS. 6 and 7B. On the average, the dewdrop steps 13 imaged on the fisheye steps 8 of the second fisheye step groups 9 are darker than those on the fisheye steps 6 of the first fisheye step groups 7. The contrast between the large and bright areas 7 and the small and dark areas 9 creates an appearance of depth to the lamp.

FIG. 8 through 12 show a third embodiment of a marker lamp 1B for vehicles constructed according to the present invention.

Figure 8:
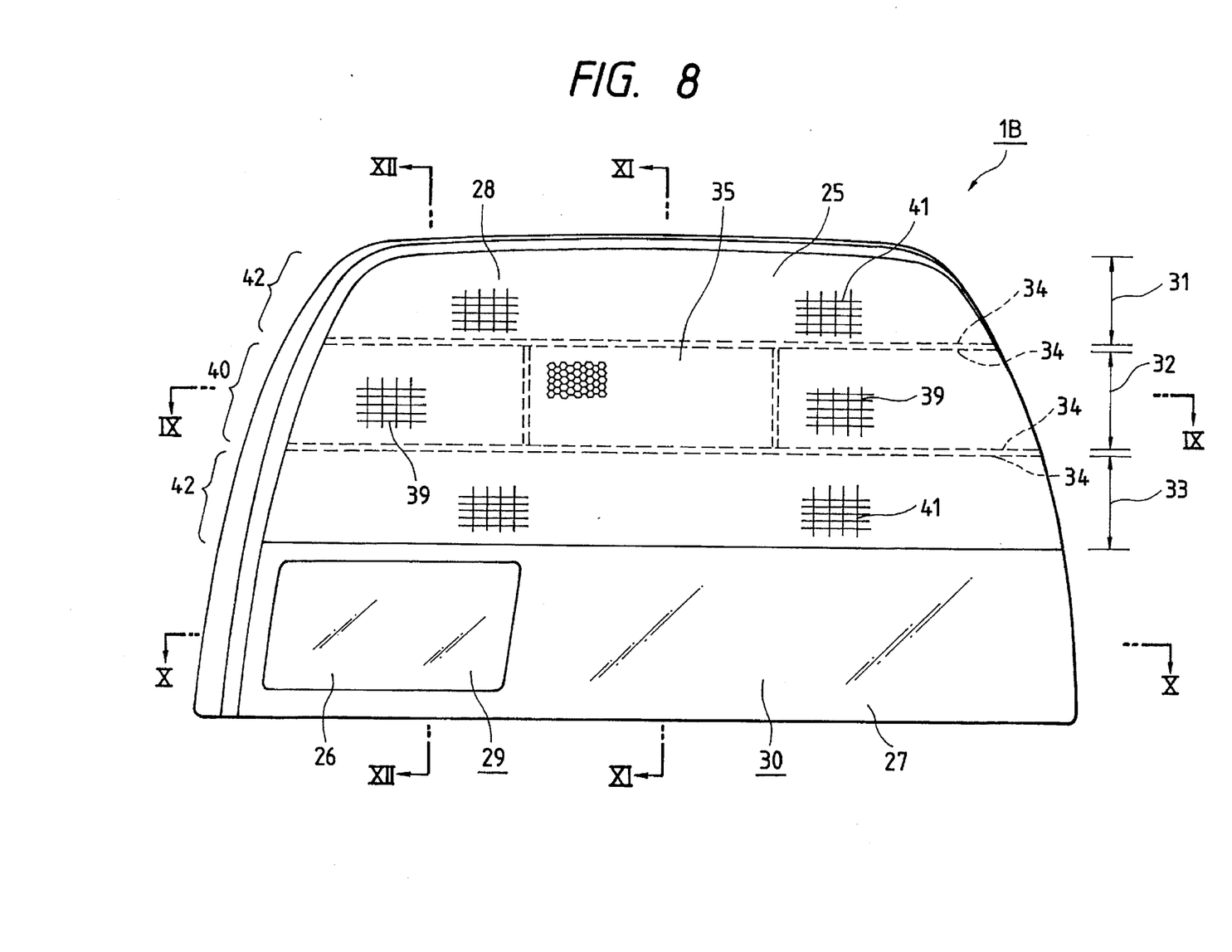
FIG. 8 is a front view showing the marker lamp.

The marker lamp 1B of the present embodiment is a rear combination lamp for motor vehicles. The marker lamp 1B is provided with a lamp body 15 made of synthetic resin. The lamp body 15 opens toward the front, and includes three different lamp chambers, namely, a tail and stop lamp chamber 16, a backup lamp chamber 17, and a turn signal lamp chamber 18. The tail/stop lamp chamber 16 occupies an upper approximately two-thirds portion of the space within the lamp body. The backup lamp chamber 17 occupies the left approximately one-third lower portion of the lamp body space. The turn signal lamp chamber 18 occupies the remaining approximately one-third lower portion of the lamp body space. The inner surfaces of these lamp chambers 16, 17 and 18 are coated with a reflecting coating, such as by aluminum deposition, and thus serve as reflecting surfaces.

The tail/stop lamp chamber 16 includes a principal reflecting section 16a having the shape of a paraboloid of revolution directed toward the front, with a curved extension 16b extending to the right from the right end of the principal reflecting section 16a. The backup lamp chamber 17 includes a reflecting section 17a directed toward the front. The reflecting section 17a is composed of a number of strip-like reflecting segments 19 arrayed side by side. Each of the reflecting segments 19, directed forward, is inwardly curved in vertical and horizontal section. The turn signal lamp chamber 18 includes a reflecting section 18a directed toward the front and a curved extension 18b extending to the right from the right end of the principal reflecting section 18a.

The reflecting section 17a is composed of a number of strip-like reflecting segments 20 arrayed side by side. The curved extension 18b is composed of a number of strip-like reflecting segments 21 arrayed from the rear to the front of the lamp body. The reflecting segments 20 of the reflecting section 18a, directed forward, is inwardly curved when viewed in vertical and horizontal section. The reflecting segments 21 of the curved extension 18b have curved surfaces protruding forward in horizontal section, and are substantially linear in vertical cross section.

A bulb 22 is removably attached to the central part of the principal reflecting section 16a of the tail/stop lamp chamber 16. Further, a bulb 23 is removably attached to the central part of the principal reflecting section 17a of the backup lamp chamber 17. Still further, a bulb 24 is removably attached to the central part of the principal reflecting section 18a of the turn signal lamp chamber 18.

Lenses 25, 26 and 27 are fastened to the lamp body 15. The lens 25 is located so as to cover the opening of the tail/stop lamp chamber 16, thereby forming a tail/stop lamp 28. The lens 26 is located so as to cover the opening of the backup lamp chamber 17, thereby forming a backup lamp 29. The lens 27 is located so as to cover the opening of the turn signal lamp chamber 18, thereby forming a turn signal lamp 30.

The present invention is applied to the tail/stop lamp 28 of the rear combination lamp 1B.

The lens 25 is vertically divided into three sections 31, 32 and 33 that are substantially equal in area to one another. These sections are delineated by paired linear stripes 34 each outwardly curved in cross section.

A number of retroreflection elements 36 are formed on the rear side of the middle area 35 (when viewed horizontally) of the portion of the middle section 32 which faces the principal reflecting section 16a. This middle area 35 is referred to as a retroreflection area. The retroreflection area 36 is surrounded by a surrounding wall 37. The upper part and the lower part of the surrounding wall 37 are formed above the stripes of each linear stripe pair 34 that adjoin the middle section 32.

Figure 9:
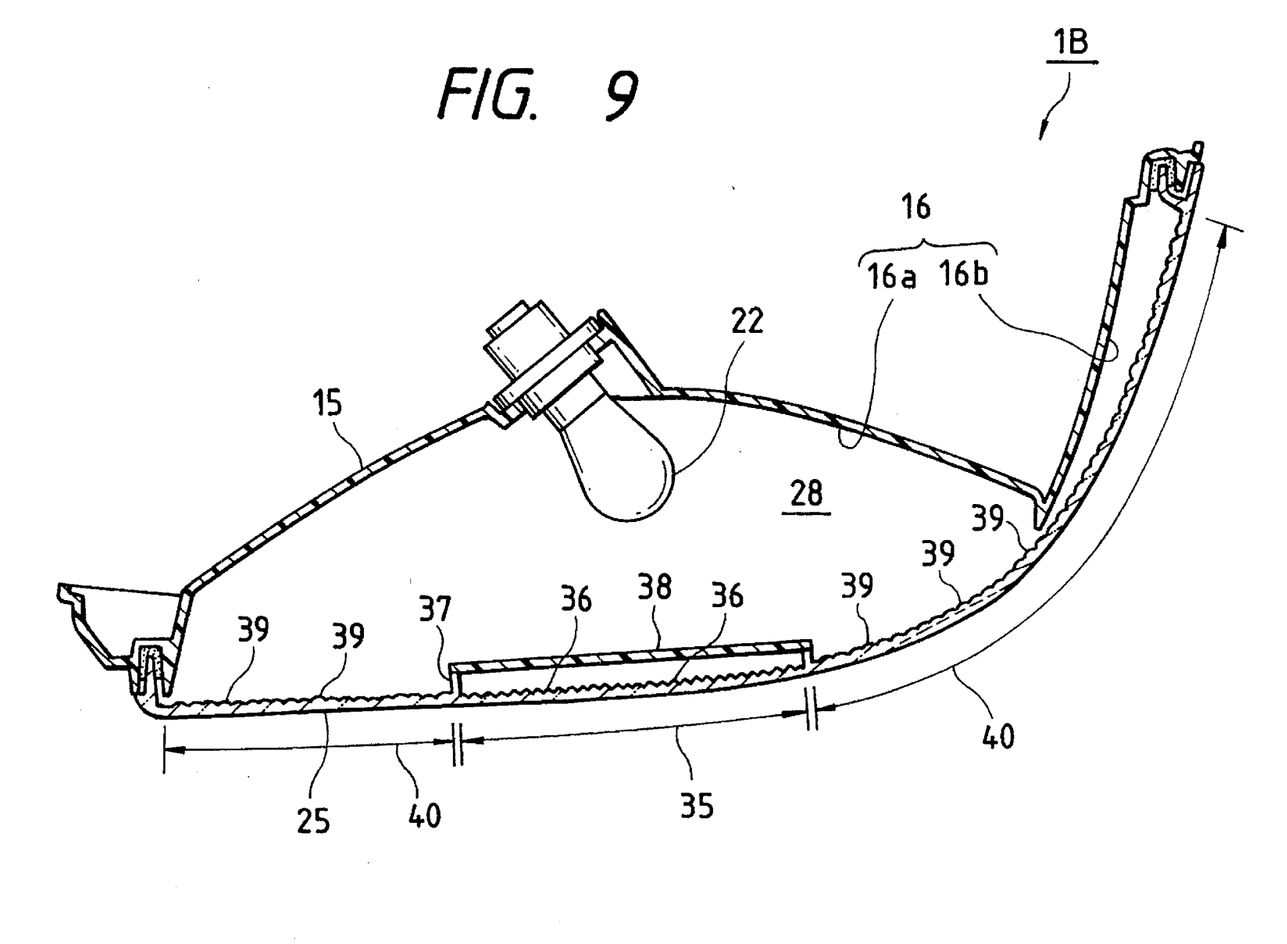
FIG. 9 is a cross-sectional view taken on a line IX—IX in FIG. 8.
Figure 10:
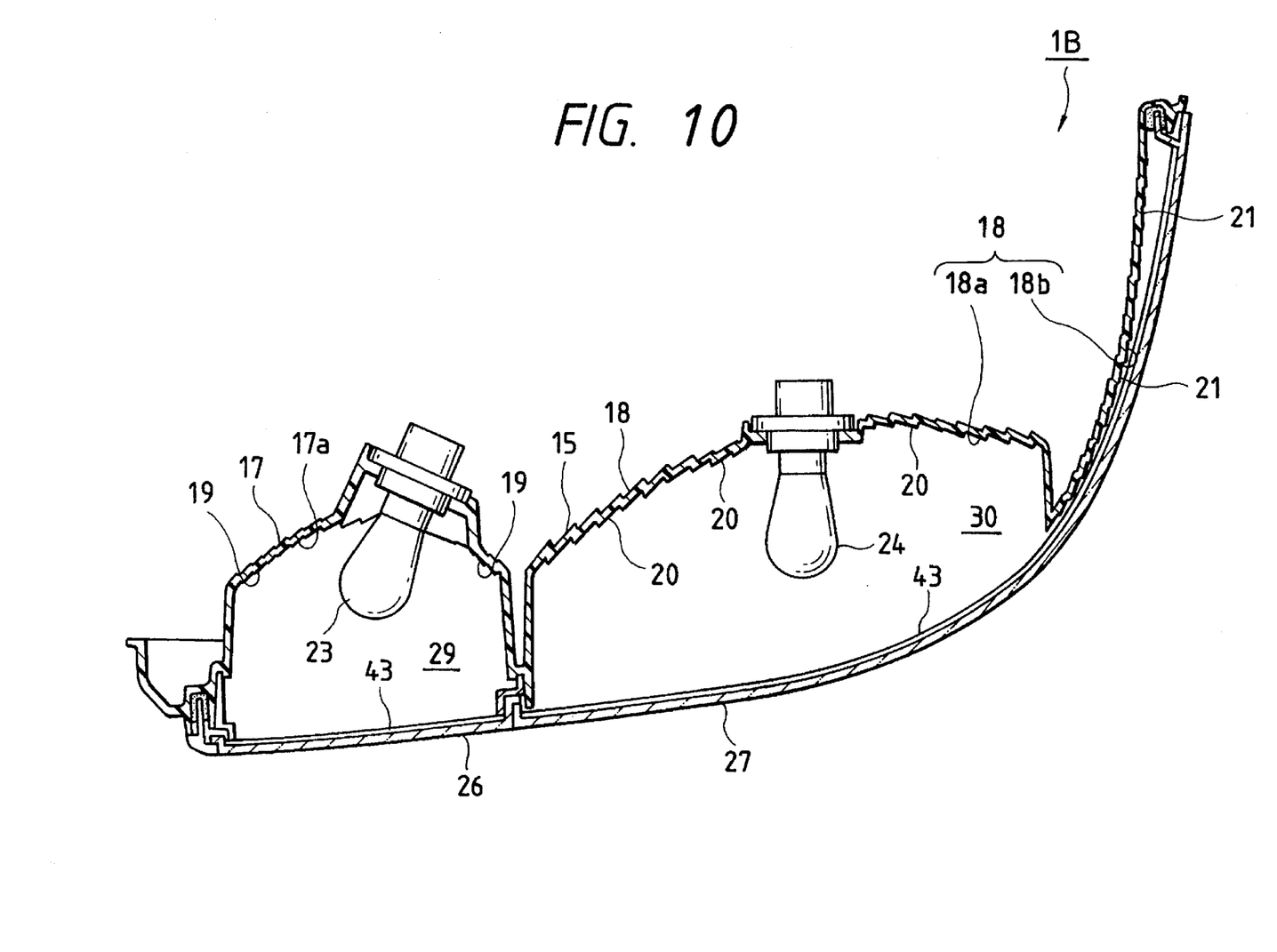
FIG. 10 is a cross-sectional view taken on a line X—X in FIG. 8.
Figure 11:
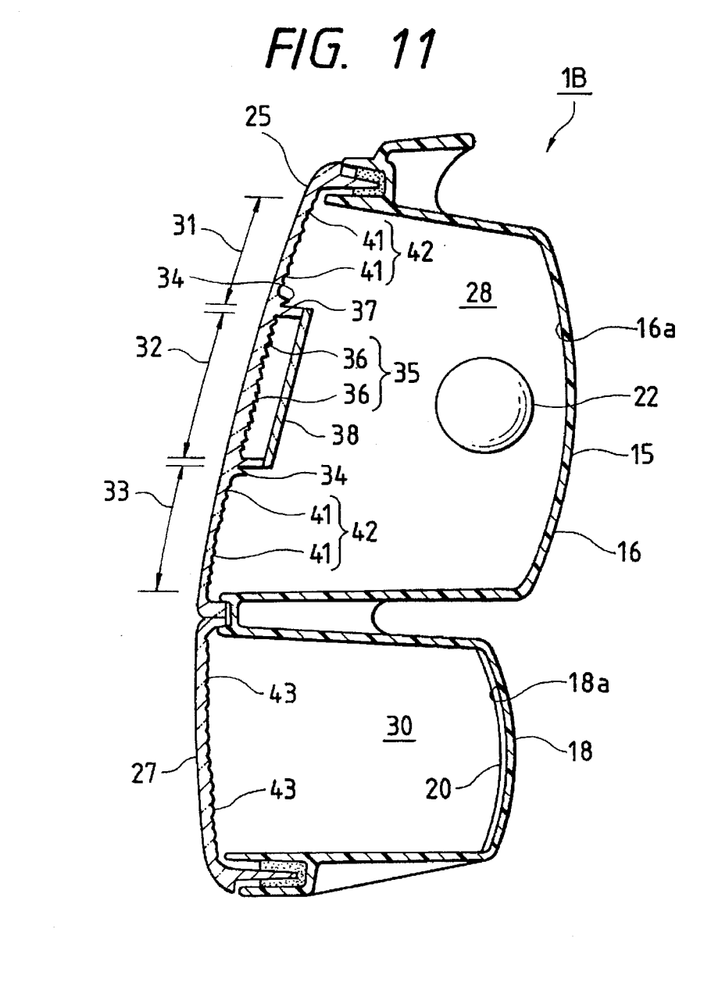
FIG. 11 is a cross-sectional view taken on line XI—XI in FIG. 8.
Figure 12:
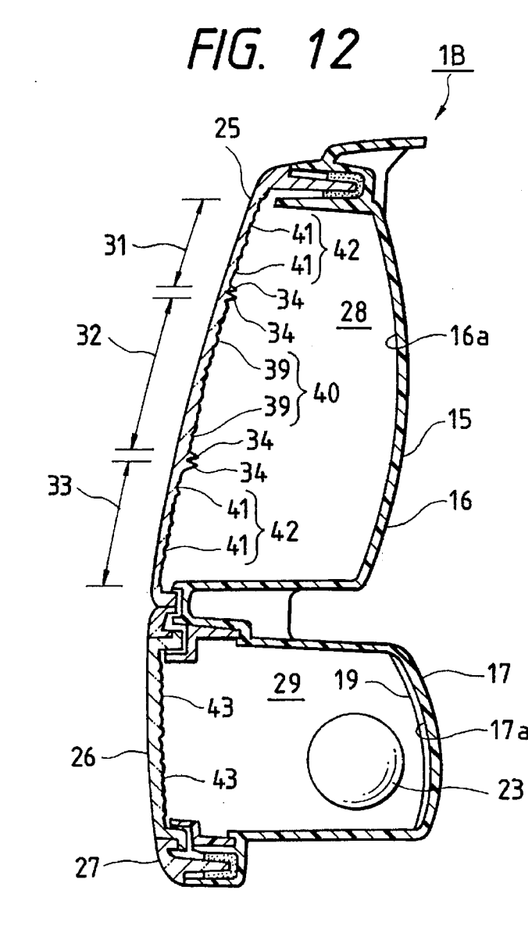
FIG. 12 is a cross-sectional view taken on a line XII—XII in FIG. 8.

The peripheral edge of a sealing plate 38 is welded to the rear ends of the surrounding wall 37, thereby sealing the retroreflection area 35. A number of fisheye steps 39, each curved outward, are formed on the rear sides of areas other than the retroreflection area 35 in the middle section 32, whereby fisheye groups 40 each composed of convex fisheye steps 39 are disposed on either side of the retroreflection area 35.

Concave fisheye steps 41 are formed on the rear sides of the upper and lower sections 31 and 33. Fisheye step groups 42, each composed of the concave fisheye steps 41, are formed on both sides of the middle section 32.

Horizontally extending cylindrical steps 43 are formed on the rear sides of the lens 26 and 27.

In the tail/stop lamp 28 of the rear combination lamp 1B, the positional difference between the images of the light source formed through the fisheye groups 40 and the fisheye step groups 42 (when viewed in the depth direction) causes the lamp to have an appearance of depth. The outwardly curved linear stripes 34 lying on the borders of the sectional areas 31, 32 and 33 clearly trace the outlines of these sectional areas. Accordingly, these linear stripes accentuate and reinforce the appearance of depth.

FIG. 13 through 16 show a fourth embodiment of a marker lamp 1C constructed according to the present invention.

Figure 13:
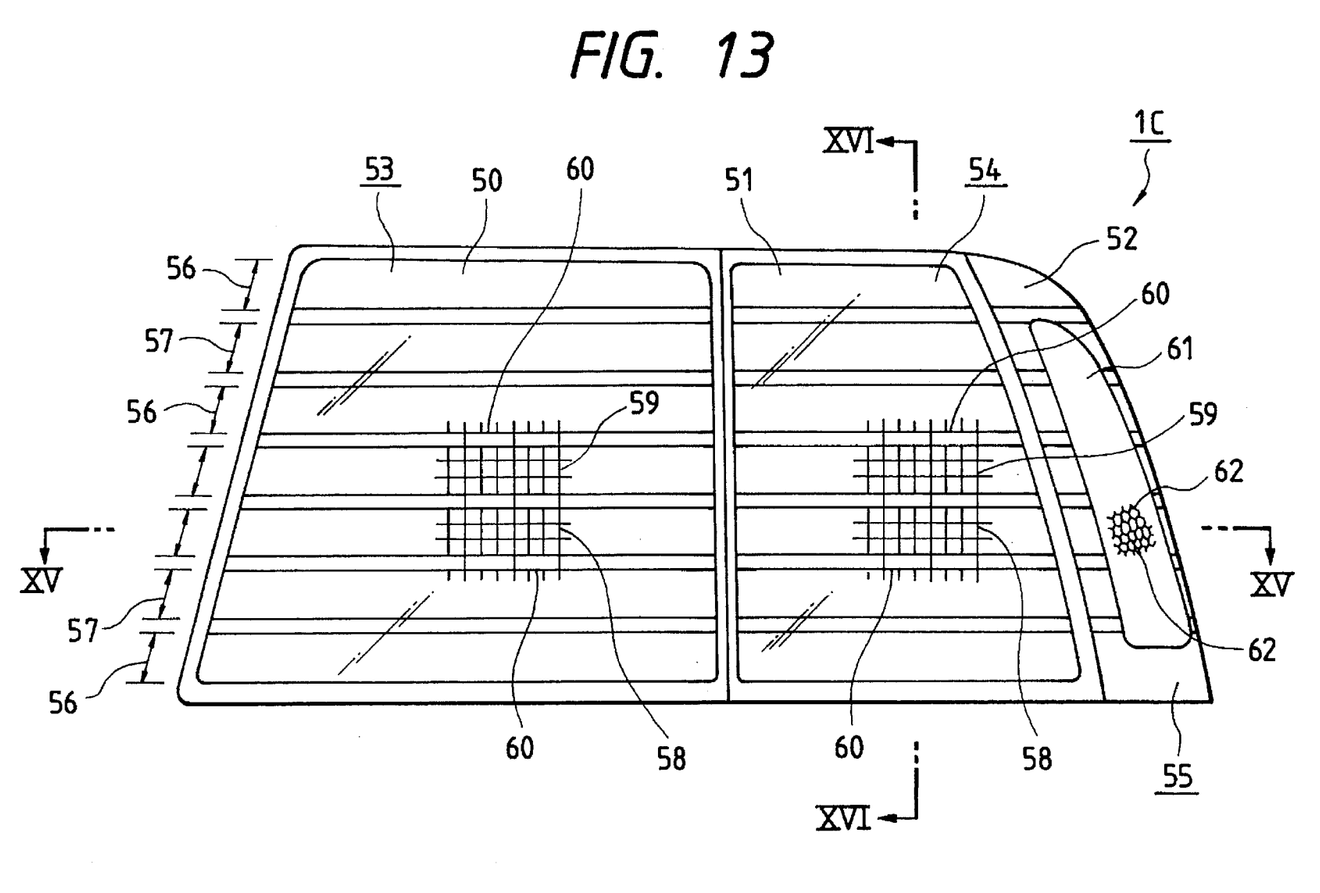
FIG. 13 is a front view showing the marker lamp.
Figure 14:
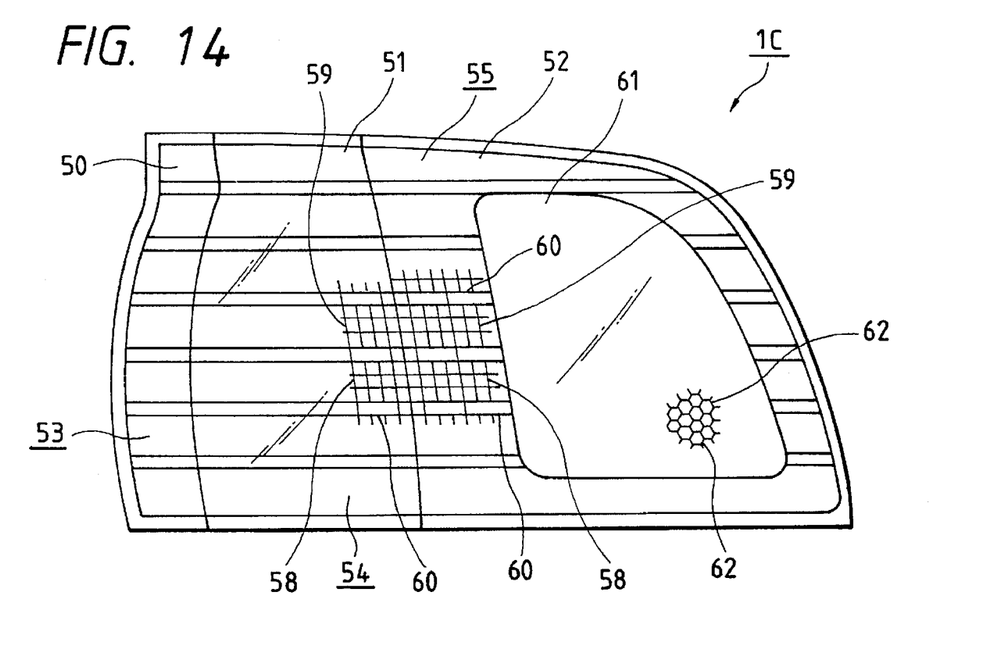
FIG. 14 is a right side view showing the marker lamp of the fourth embodiment.
Figure 15:
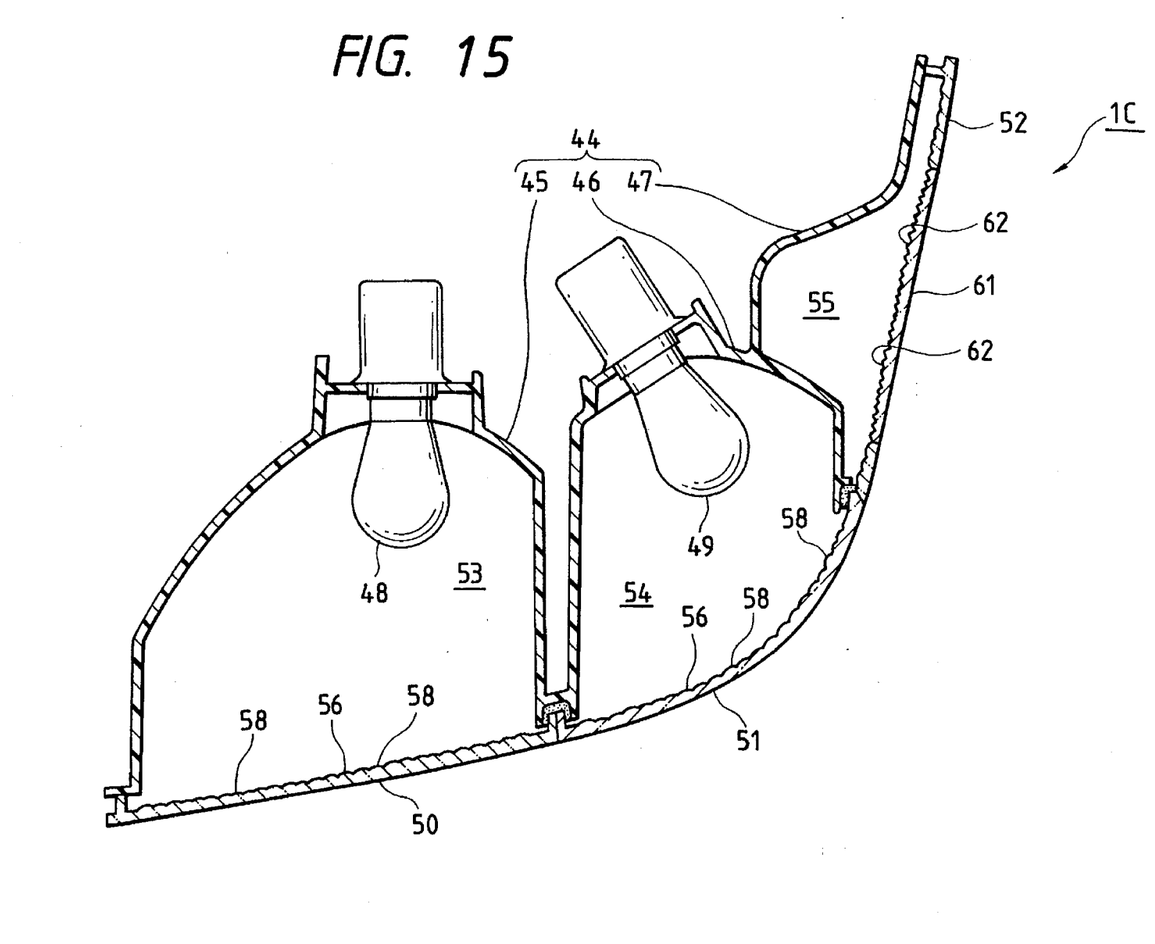
FIG. 15 is a cross-sectional view taken on a line XV—XV in FIG. 13.
Figure 16:
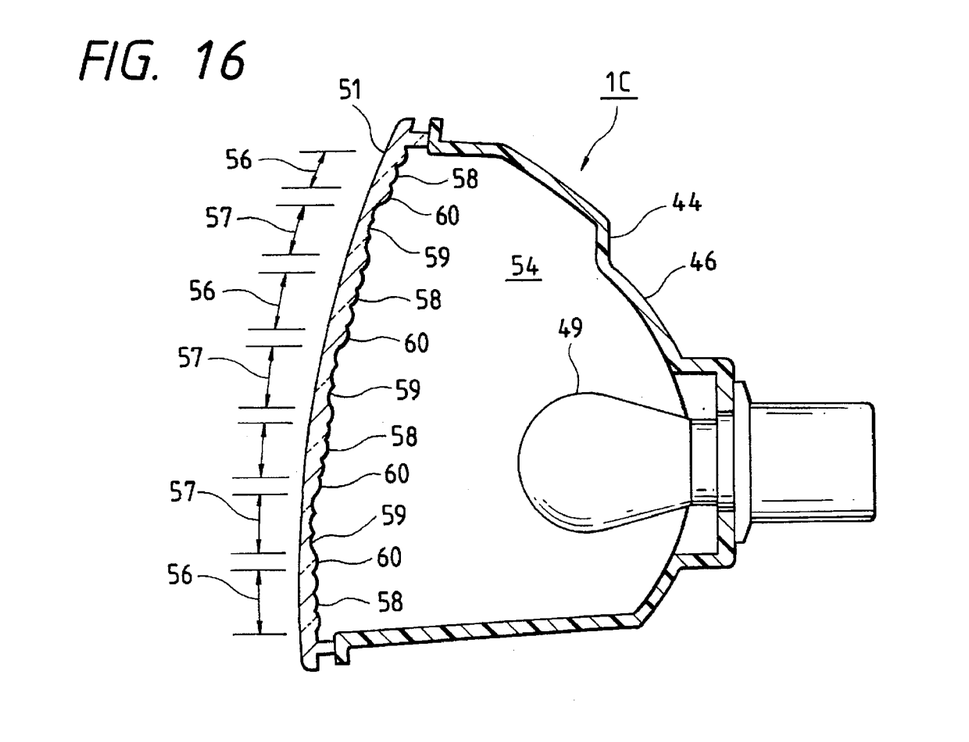
FIG. 16 is a cross-sectional view taken on a line XVI—XVI in FIG. 13. Finally.

The marker lamp 1C of the present embodiment is a rear combination lamp for motor vehicles, and includes a lamp body 44 made of synthetic resin. The lamp body 44 includes three different lamp chambers 45, 46 and 47 arranged side by side. The left lamp chamber 45 is a tail/stop lamp chamber. The right lamp chamber 46 is a turn signal lamp chamber. The lamp chamber 47, which is continuous with the turn signal lamp chamber 46, is located on the right upper side of the turn signal lamp chamber. The lamp chamber 47 serves as a reflecting lamp chamber 47. The inner surfaces of the lamp chambers 45, 46 and 47 have a reflecting coating formed thereon, such as by aluminum deposition, and thus serve as reflecting surfaces.

A bulb 48 is removably mounted in the tail/stop lamp chamber 45, and a bulb 49 is removably mounted in the turn signal lamp chamber 46. No lamp is provided in the reflecting lamp chamber 47.

Lenses 50, 51 and 52 are mounted on the lamp body 44. The lens 50 is located to cover the opening of the tail/stop lamp chamber 45, thereby forming a tail/stop lamp 53. The lens 51 is located to cover the opening of the turn signal lamp chamber 46, thereby forming a turn signal lamp 54. The lens 52 is located to cover the opening of the reflecting lamp chamber 47, thereby forming a reflecting section 55.

Fisheye step groups 56 and 57, shaped like horizontally extending stripes, are alternatingly arrayed in the vertical direction on the lens 50 of the tail/stop lamp 53. The fisheye step group 56 is composed of a number of convex fisheye steps 58, each shaped like a square when viewed from the front, that are formed on the rear side of the lens 50. The fisheye step group 57 is composed of a number of concave fisheye steps 59, each shaped like a square when viewed from the front, that are formed on the rear side of the lens 50. The fisheye step groups 56 and 57 are alternatingly arranged in the order of the convex fisheye step group 56, the concave fisheye step group 57, etc., from the top to the bottom.

Laterally extending convex fisheye steps 60 are horizontally arranged between the adjacent fisheye step groups 56 and 57. The height of the convex fisheye steps 60 is almost equal in height to the fisheye steps 58 and 59, but the width thereof is about three times as long as the steps 58 and 59.

Convex fisheye step groups 56 and concave fisheye step groups 57 are alternatingly formed on the lens 51 of the turn signal lamp 54, similar to the lens 50. A lateral convex fisheye step 60 is also horizontally arranged between the adjacent convex and concave fisheye step groups 56 and 57.

A retroreflection part 61 is formed on the surface of the lens 52 except its peripheral surface area. A number of retroreflection elements 62 are formed on the rear side of the retroreflection part 61. Convex fisheye step groups 56 and concave fisheye step groups 57 are alternatingly formed on the peripheral surface area except the retroreflection part 61. A lateral convex fisheye step 60 is also horizontally arranged between the adjacent concave and convex fisheye step groups 56 and 57.

For the lenses 50, 51 and 52, the positional difference between the images of the light source formed through the convex fisheye groups 56 and the images formed through the concave fisheye step groups 57 (when viewed in the depth direction) creates an appearance of depth for the lamp. With the lateral convex linear steps 60 lying on the borders of the fisheye groups 56 and 57, the borders appear glittering, enhancing the appearance of depth.

As seen from the foregoing description, a marker lamp for vehicles according to the present invention is characterized in that the front opening of a lamp space with a light source disposed therein is covered with a lens, and the lens includes at least two types of fisheye step groups whose locations are shifted in the depth direction of the lamp.

In the marker lamp thus constructed, in the first fisheye step groups, real images of the light source are formed on the front side of the lens by the convex fisheye steps. In the second fisheye step groups, virtual images are formed on the rear side of the lens by the concave fisheye steps. The distance between the real and virtual images of the light source provides the marker lamp with an appearance of depth.

Figure 17:
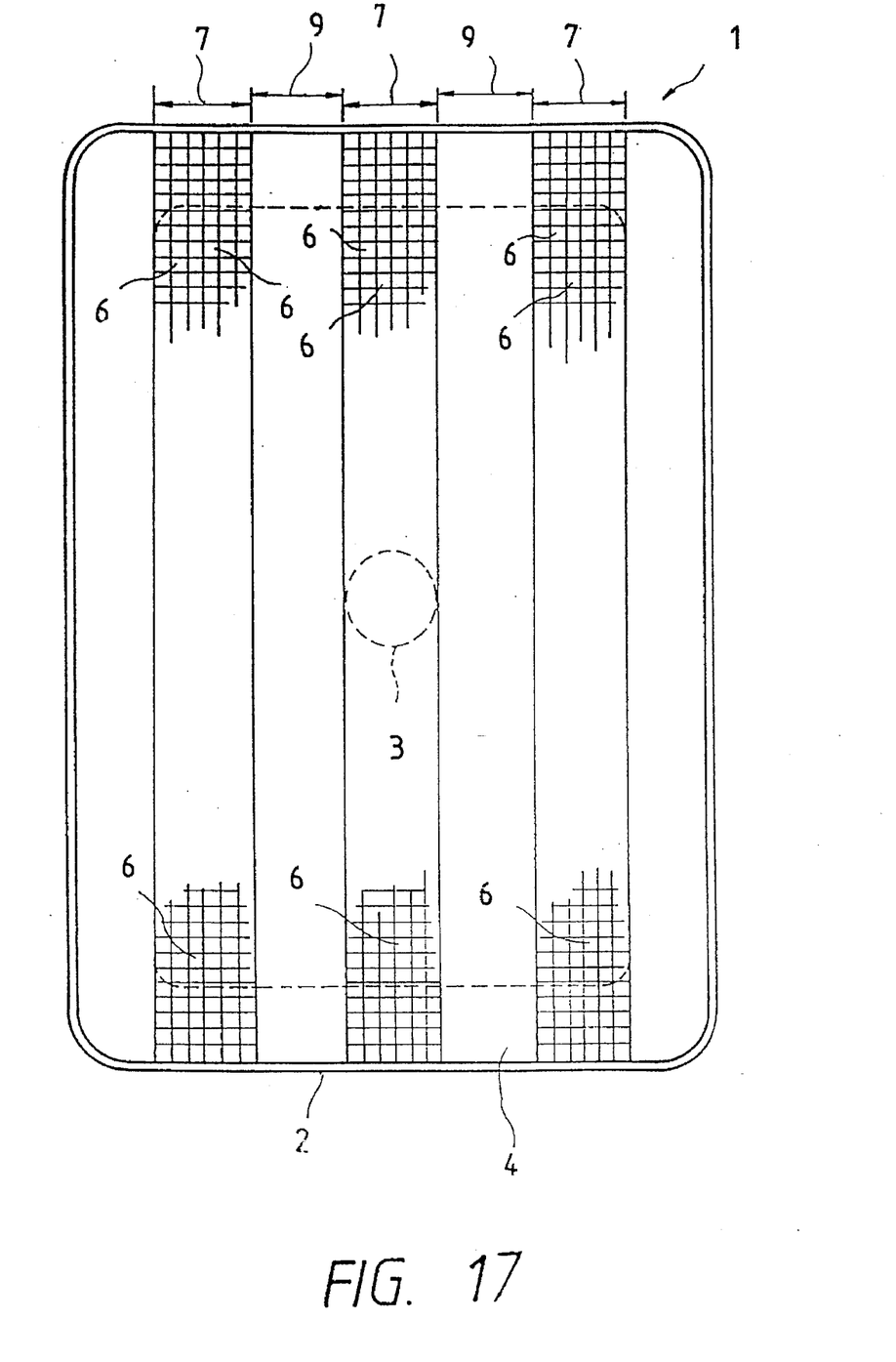
FIG. 17 shows an embodiment where the arrangement of lens designs in FIG. 1 are rotated by 90°.

While in the above-mentioned embodiment, the first and second fisheye step groups are alternatingly arranged in the vertical direction, these fisheye step groups may be alternatingly arranged in the horizontal direction as seen in FIG. 17. The number of the fisheye step groups is not limited to that in the above-described embodiments, but may be properly selected.

It should be understood that the form of the invention herein shown and described is to be taken as preferred examples of the invention and that various changes in the shape, size and arrangement of parts may be resorted to without departing from the spirit of the invention or the scope of the subjoined claims.

What is claimed is:

1. A vehicular marker lmp comprising:
   a lamp body having a front opening;
   a reflector disposed at an inner-rear surface of said lamp body;
   a light source mounted at the central part of said lamp body for emitting a light beam; and
   an outer lens covering said front opening of said lamp body, said outer lens comprising a first fisheye step group comprising convex fisheye steps and a second fisheye step groups comprising concave fisheye steps whereby an appearance of depth is provided.

2. A vehicular lamp comprising:
   a lamp body having a front opening;
   a reflector disposed at an inner-rear surface of said lamp body;
   a light source mounted at the central part of said lamp body for emitting a light beam; and
   an outer lens covering said front opening of said lamp body, said outer lens comprising a first fisheye step group comprising convex fisheye steps and a second fisheye step groups comprising concave fisheye, wherein said outer lens is segmented into a plurality of segmental areas that are equal in width, said first fisheye step group being formed on a rear surface of an odd number of said segmental areas and said second fisheye step group being formed on a rear surface of an even number of said segmental areas.

3. A vehicular lamp comprising:
   a lamp body having a front opening;
   a reflector disposed at an inner-rear surface of said lamp body;
   a light source mounted at the central part of said lamp body for emitting a light beam: and
   an outer lens covering said front opening of said lamp body, said outer lens comprising a first fisheye step group comprising convex fisheye steps and a second fisheye step groups comprising concave fisheye steps, wherein said outer lens is segmented into a plurality of segmental areas that are equal in width, said first fisheye step group being formed on a rear surface of an even number of said segmental areas, and said second fisheye step group being formed on a rear surface of an odd number of said segmental areas.

4. The vehicular lamp according to either one of claims 2 or 3, wherein said outer lens is vertically segmented.

5. The vehicular lamp according to claim 4, wherein said outer lens is segmented into five segmental areas, said first fisheye step group being formed on a side of a top, middle, and bottom ones of said segmental areas and said second fisheye step group being formed on a rear side of other ones of said segmental areas.

6. The vehicular lamp according to either one of claims 2 or 3, wherein said outer lens is horizontally segmented.

7. The vehicular lamp according to claim 6, wherein said outer lens is segmented into five segmental areas, said first fisheye step group being formed on a rear side of leftmost, middle, and rightmost ones of said segmental areas, and said second fisheye step group being formed on a rear side of other ones of said segmental areas.

8. The vehicular lamp according to claim 1, further comprising an inner lens, formed of a transparent synthetic resin, covering said front opening of said lamp body, said inner lens being located inside said outer lens.

9. The vehicular lamp according to claim 8, wherein said inner lens comprises dewdrop-shaped steps formed on a rear side thereof, said dewdrop-shaped steps being circular when viewed from a front thereof and semicircular in cross section.

10. A vehicular lamp comprising:

a lamp body having a front opening;

a reflector disposed at an inner-rear surface of said lamp body;

a light source mounted at the central part of said lamp body for emitting a light beam; and an outer lens covering said front opening of said lamp body, said outer lens comprising a first fisheye step group comprising convex fisheye steps and a second fisheye step groups comprising concave fisheye steps, wherein said outer lens is vertically segmented into four segmental areas, said first fisheye step group being formed on a rear surface of a second segmental area from a top one of said segmental areas, and said second fisheye step group being formed on a rear surface of a top and third ones of said segmental areas.

11. The vehicular lamp according to claim 10, further comprising a retroreflection area comprising a plurality of retroreflection elements disposed on said second segmental area in locations where said first fisheye step group is formed.

12. The vehicular lamp according to claim 11, further comprising a wall surrounding said retroreflection area, an upper part and a lower part of said surrounding wall being formed above stripes of a linear stripe pair that adjoins said second segmental area, and a sealing plate, a peripheral edge of said sealing plate being welded to rear ends of said surrounding wall.

13. The vehicular lamp according to claim 10, wherein a bottom one of said segmental areas comprises horizontally extending cylindrical steps formed on a rear side thereof.

14. The vehicular lamp according to claim 13, wherein said outer lens comprises a backup lamp lens and a turn signal lamp lens.

15. A vehicular lamp comprising:

a lamp body having a front opening;

a reflector disposed at an inner-rear surface of said lamp body;

a light source mounted at the central part of said lamp body for emitting a light beam; and an outer lens covering said front opening of said lamp body, said outer lens comprising a first fisheye step group comprising convex fisheye steps and a second fisheye step groups comprising concave fisheye steps, wherein said lamp body comprises first, second and third lamp chambers arranged side by side, said first lamp chamber being a tail/stop lamp chamber, said second lamp chamber being a turn signal lamp chamber, and said lamp chamber being continuous with said second lamp chamber and being located on a right upper side of said second lamp chamber, said third lamp chamber serving as a reflecting lamp chamber, inner surfaces of said first, second and third lamp chambers having a reflecting coating formed thereon, and said lens being segmented into first, second and third sectional areas corresponding to said first, second and third lamp chambers, respectively.

16. The vehicular lamp according to claim 15, wherein each of said first, second and third lenses is vertically segmented into a plurality of sectional areas, said first and second fisheye step groups being formed in said vertically segmented sectional areas alternatingly.

17. The vehicular lamp according to claim 16, further comprising laterally extending third convex fisheye steps horizontally arranged between adjacent first and second fisheye step groups, a height of each said third convex fisheye steps being substantially equal in height to said first and second fisheye steps, and a width of each of said third convex fisheye steps being about three times as long as a width of said first and second steps.

18. The vehicular lamp according to claim 1, wherein said lens is made of synthetic resin.

19. A vehicular marker lamp comprising:

a lamp body having a front opening;

a reflector disposed at an inner-rear surface of said lamp body;

a light source mounted at the central part of said lamp body for emitting a light beam; and an outer lens covering said front opening of said lamp body, said outer lens comprising a first fisheye step group comprising convex fisheye steps and a second fisheye step groups comprising concave fisheye steps whereby an appearance of depth is provided wherein said outer lens is segmented into a plurality of segmental areas that are equal in width, said first fisheye step group being formed on a rear surface of an odd number of said segmental areas and said second fisheye step group being formed on a rear surface of an even number of said segmental areas wherein said outer lens is vertically segmented into four segmental areas, said first fisheye step group being formed on a rear surface of a second segmental area from a top one of said segmental areas, and said second fisheye step group being formed on a rear surface of a top and third ones of said segmental areas.

\* \* \* \* \*